US006343264B1

(12) United States Patent
Fenton et al.

(10) Patent No.: US 6,343,264 B1
(45) Date of Patent: Jan. 29, 2002

(54) COLOR SELECTION METHOD AND SYSTEM FOR FLOOR, WALL, AND WINDOW COVERINGS

(75) Inventors: Kathleen H. Fenton, Penn Valley; James H. Holbrook, III, Grass Valley, both of CA (US); Chris Foret, Shawnee Mission, KS (US)

(73) Assignee: Carpet Co-op of America Association, Earth City, MO (US)

( * ) Notice: Subject to any disclaimer, the term of this patent is extended or adjusted under 35 U.S.C. 154(b) by 0 days.

(21) Appl. No.: 09/023,907

(22) Filed: Feb. 13, 1998

(51) Int. Cl.$^7$ ................................................. G06G 7/48
(52) U.S. Cl. ............................ 703/6; 382/100; 345/426
(58) Field of Search .................... 703/4, 6, 13; 382/100; 345/426

(56) References Cited

U.S. PATENT DOCUMENTS

| | | | | | |
|---|---|---|---|---|---|
| 5,493,518 | A | * | 2/1996 | Keating | 395/500.27 |
| 5,630,038 | A | * | 5/1997 | Itoh et al. | 345/431 |
| 5,680,333 | A | * | 10/1997 | Jansson | 395/500.27 |
| 5,743,407 | A | * | 4/1998 | Williams | 206/575 |
| 5,751,829 | A | * | 5/1998 | Ringland et al. | 382/100 |

FOREIGN PATENT DOCUMENTS

EP             0624850 A2  * 11/1994  .......... G06F/15/72

OTHER PUBLICATIONS

Sullivan, "Photorealistic Light Simulation", Architecture Magazine, pp. 177–179, Oct. 1996.*
Nakanishi et al, "Color Planning by Fuzzy Set Theory", IEEE International Conference on Fuzzy Systems, pp. 5–12, Mar. 1992.*
Mulholland, "Introduction to Color Theory", Plastics Engineering, vol. 53 pp. 33–35 (Aug. 1997).*

* cited by examiner

Primary Examiner—Kevin J. Teska
Assistant Examiner—Samuel Broda
(74) Attorney, Agent, or Firm—Hovey, Williams, Timmons & Collins

(57) ABSTRACT

An improved color selection process for assisting customers when shopping for floor, wall, or window coverings is disclosed. The color selection process includes: (a) the creation of a digital and graphic computer database that classifies a store's or other entity's entire product inventory according to internally harmonious color families, and (b) a visualization experience, using this database, computer graphics and a specially designed color room to give customers a more realistic preview of product(s) being considered.

15 Claims, 2 Drawing Sheets

COLOR SELECTION METHOD AND SYSTEM FOR FLOOR, WALL, AND WINDOW COVERINGS

BACKGROUND OF THE INVENTION

1. Field of the Invention

Figure 1:
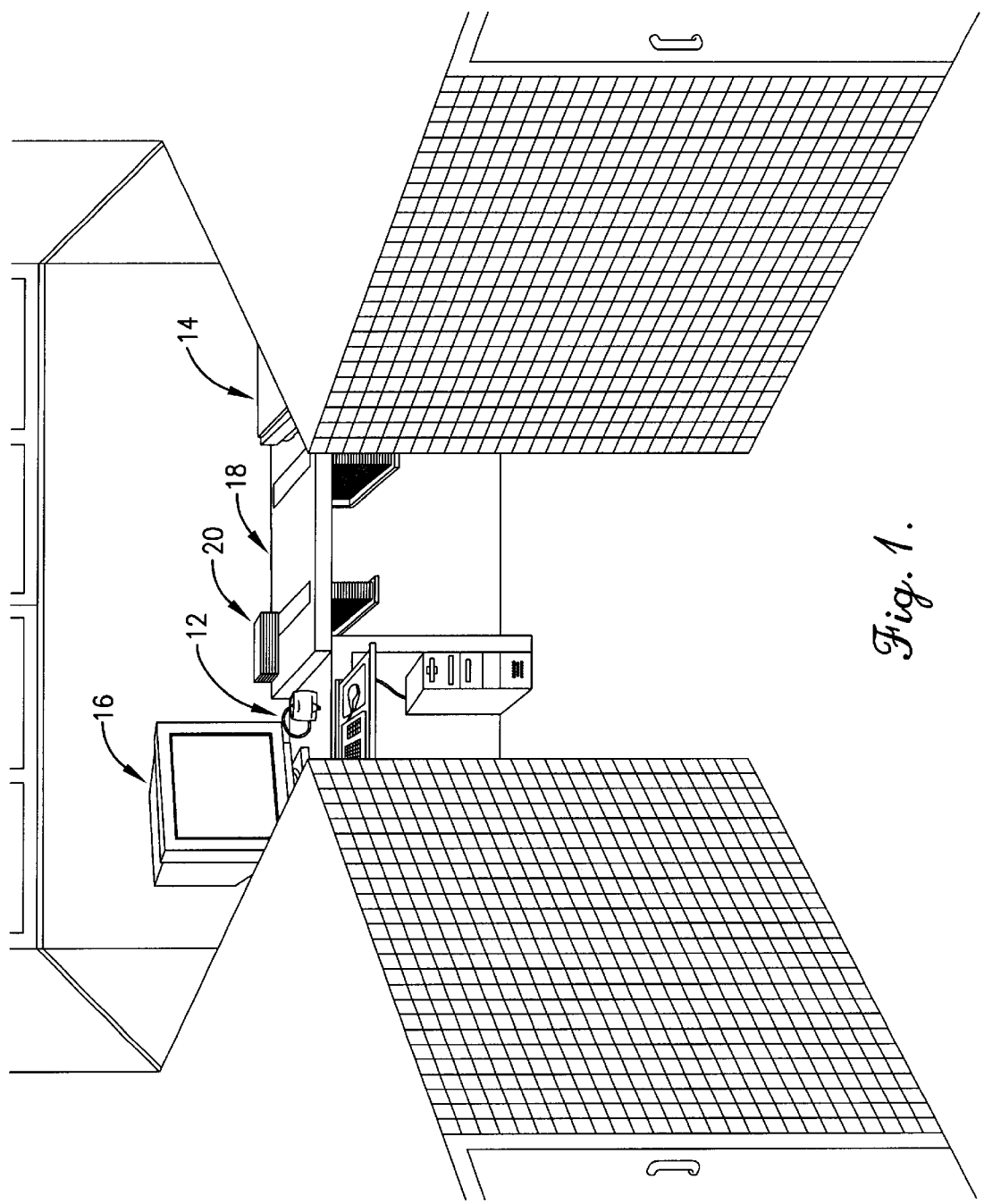

The present invention relates to a color selection process for floor, wall, and window coverings such as carpet.

2. Description of the Prior Art

Customers shopping for floor, wall and window coverings almost universally experience difficulty and frustration in selecting colors that harmonize with their living environment. It has been estimated that typical customers shop an average of four to five stores, see hundreds of samples, usually under poor lighting conditions, attempt to choose appropriate options with poor to fair staff assistance, and are asked to visualize an entire floor or wall on the basis of small samples. Further, because showroom samples are a primary marketing tool, the dealer is often reluctant to allow customers to take them home freely. The average consumer has little experience with interior decorating, and the prospect of investing thousands of dollars in the wrong carpet, for example, is so daunting that thirty-three percent (33%) of those who set out to purchase carpet give up.

No known major franchise, cooperative or retailer has attempted to classify floor, window and wall coverings across vendor lines, based on color harmonies. At most, a carpet dealer might have a wall of samples, to indicate color range, or a staff member sensitive to interior decorating concerns, but no simple, easy-to-use system for helping customers make a confident color selection appropriate to their personal living space.

Further, in attempting to help the customer through the color selection process, the dealer's marketing options are currently limited, for all practical purposes, to the samples in the showroom. Samples are costly and individual retail dealers can display only a small number of the available vendor lines. Though a carpet dealer, for example, may belong to a national cooperative offering thousands of different carpets in every color of the rainbow, there is no feasible way to access, focus or present these color options to a customer.

Computer simulation and visualization programs wherein samples of products or photographs of samples are scanned into a computer to simulate the products have been developed in an attempt to alleviate some of these problems. However, to date, known computer visualization programs have been too limited to answer any of these problems because of technical difficulties. Specifically, because carpet and fabric is three dimensional, scanning thousands of different samples, or photographs of samples, into the computer requires a paralyzing amount of memory and storage space. A second limitation of known computer simulation and visualization programs has been their inability to render color on a computer screen with sufficient accuracy to show the subtle distinctions so important in distinguishing one carpet or fabric from another.

OBJECTS AND SUMMARY OF THE INVENTION

The present invention solves the above-described problems and provides a distinct advance in the state of the art by providing an improved color selection process for assisting customers when shopping for floor, wall, or window coverings. The color selection process of the present invention broadly includes: (a) the creation of a digital and graphic computer database that classifies a store's or other entity's entire product inventory according to internally harmonious color families, and (b) a visualization experience, using this database, computer graphics and a specially designed color room to give customers a more realistic preview of product(s) being considered. These items, taken in combination, constitute a unique and extremely powerful selling and purchasing advance in the industry.

BRIEF DESCRIPTION OF THE DRAWING FIGURES

Figure 2:
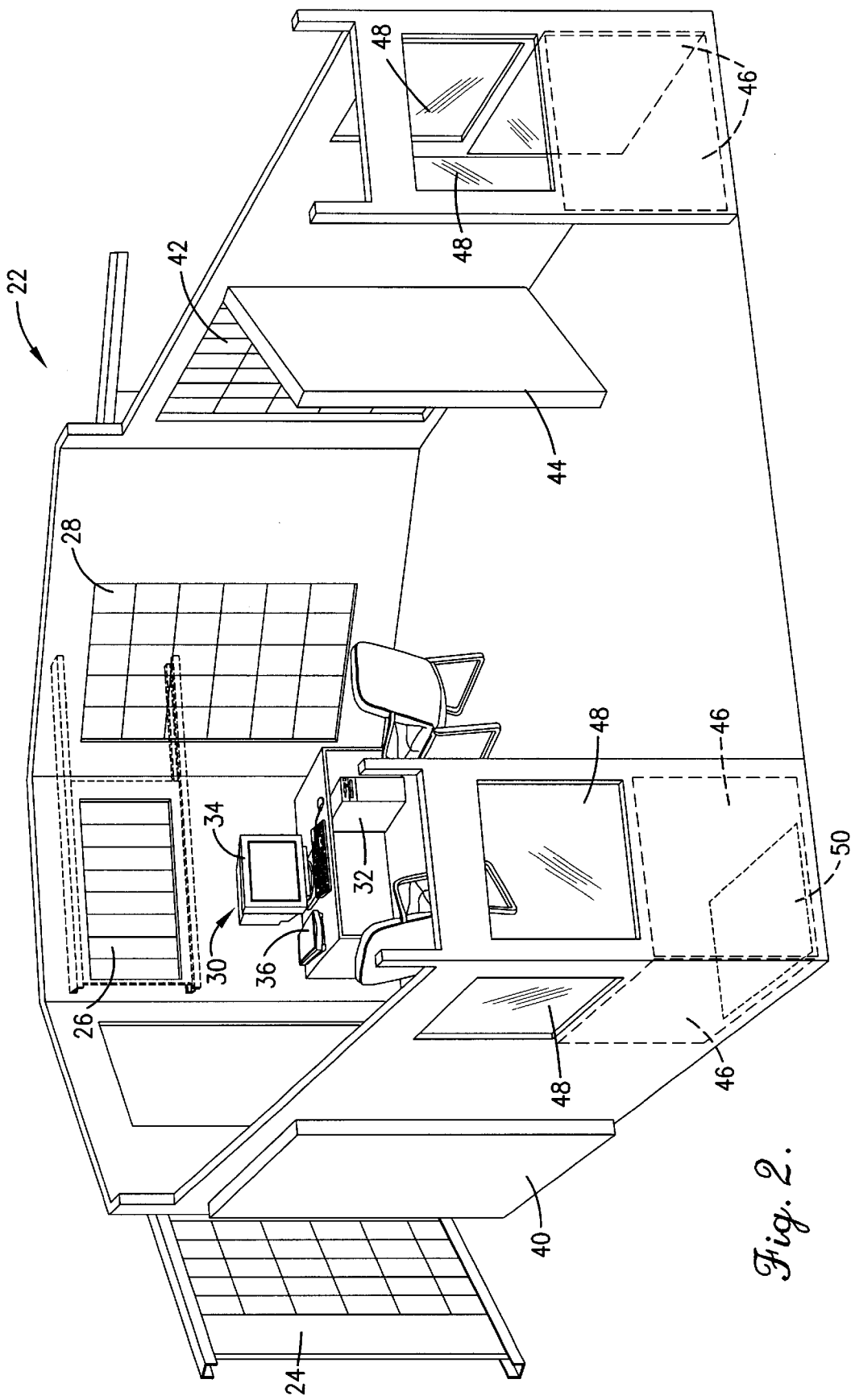

A preferred embodiment of the present invention is described in detail below with reference to the attached drawing figures, wherein:

FIG. 1 is a perspective view of a corporate resource room in which the color-coding process of the present invention occurs; and FIG. 2 is a perspective view of a color room used during the color visualization process of the present invention.

DETAILED DESCRIPTION OF THE PREFERRED EMBODIMENTS

The color selection process of the present invention broadly includes two parts: (a) the creation of a digital and graphic computer database in a unique color-coding process to classify a store's or other entity's entire product inventory according to internally harmonious color families, and (b) a visualization experience, using this database, computer graphics and a specially designed color room to give customers a more realistic preview of product(s) being considered. Each of these parts of the invention are described separately below. For ease of explanation, the detailed description of the invention herein describes a color selection process for carpet; however, the color selection process can be applied to any floor, window and wall coverings and other products that are manufactured in a plurality of different colors.

COLOR-CODING PROCESS

At the heart of the color-coding process is the concept of "color families". A color family is a group of colors from which any combination can be chosen with assurance of harmony. The present invention has color families initially based on the copyrighted two-palette ("Color Key 1" and "Color Key 2") color system for Ameritone paint colors developed by the Color Key Corporation.

Building on the original Color Key system, the present invention identifies three color families. The first color family, like Color Key's "Key 1 Colors" includes all hues except orange; the second color family, like Color Key's "Key 2 Colors", includes all hues except blue-green and magenta; and the third family, which was developed entirely for the present invention, is a small palette of "crossover" colors that can be combined with either of the other two color families.

Once customers identify the color family of their home decor, they are able to select floor, window and/or wall coverings with the security that any color chosen from that color family will match their existing interiors.

However, individual retail stores or dealers cannot make full use of this color family system unless the hundreds (or thousands) of available products can be accurately color-coded at the corporate level, and then accurately rendered graphically on a computer screen for the customer to see. Otherwise the dealer is still confined to the limited product lines sampled in the showrooms. Until now, these considerations have stymied the implementation of a comprehensive color selection system in the industry.

The color-coding procedures are preferably performed in a corporate resource room partially depicted in FIG. 1. The corporate resource room preferably has white walls, and a white ceiling.

In the first step of the color coding process, an artist matches a solid-colored carpet sample to "color chips" which have been classified according to color family. These "color chips" are preferably paint chips or ink swatches that have been printed on stiff paper to show the different colors offered by a paint or ink manufacturer, but any flat-surfaced, solid-colored, portable color swatch can be used.

The color matching procedure must be done in bright indirect daylight, preferably provided by the north-facing windows and skylights. The procedure is preferably performed by an artist or other operator with an accurate eye for color.

The corporate resource room is preferably equipped with two, quick match" color walls. Preferably, one wall is mounted with all the color chips contained in the original Color Key 1 color fan, arranged in rainbow order; the other wall is mounted with all the color chips contained in the original Color Key 2 color fan, arranged in rainbow order. Underneath each of these color chips a corresponding carpet cutting is preferably mounted, when possible, because it is sometimes easier to "quick-match" a carpet sample to another carpet, rather to a color chip.

Using the "quick match" wall, the artist preferably begins the color-matching procedure by identifying the color family and general Color range of the carpet sample that is to be coded.

The artist then takes the sample to a large drafting table 18, preferably located away from the "quick match" walls. The drafting table is preferably equipped with a very large stack of color chips 20 for each color family, preferably arranged in strips of three or four. The strips are preferably held together in a stack using a post, like a giant color fan. The strips can be detached from the post. The stacks preferably rest on moveable trays 15, positioned below rectangular openings in the drafting table. As the artist pushes the tray up, more of the stack appears above the level of the table. As the artist pushes the tray down, less of the stack appears above the level of the table.

The color chips in these stacks are preferably arranged in rainbow order and include not only the colors on the "quick match walls" 17, but also as many of the shades in between as possible. In each stack, the "cross-over" colors which can be included in Color Family 3, are preferably marked or tagged.

Preferably, the artist sets the carpet sample flat on the drafting table, between the two rectangular openings, and compares it to color chips which are also lying flat, at the same level as the carpet sample, until a match is found.

In order to do this, the artist, using the information obtained at the "quick match wall," preferably moves one of the trays up or down until the general color range of the carpet sample is found in the stack of color chips. Then he pushes aside the portion of the stack above the level of the table, and brings the first strip he wants up to the level of the carpet sample. If none of these chips matches the sample, he pushes the strip aside and brings the next strip level with the carpet sample, and continues until he finds a chip that matches the sample.

Once the match is found, the artist or other operator preferably detaches the strip containing the matching color chip, and takes it to the computer station, which preferably includes a computer 13, a large graphic display monitor 16, and a color-analyzing device 12. The computer station may also include a digital camera of at least the quality of the Kodak DC120, as well as a high-end scanner 14.

The computer is preferably at least a Power Macintosh 9600 having 300 MHz or faster processor running Mac OS 8.0 software and includes at least 96MB of RAM, an 8 M video card, at least a 4 GB hard drive, and a high end 21" or larger color graphics monitor with Trinitron technology. Alternately, the computer may be an equivalent IBM or compatible personal computer. The computer is loaded with graphics software such as PhotoShop (or a similar graphics program), ColorShop (or a similar color management program), and Kodak 120 Digital Access Software (or similar digital camera interface software).

The color analyzing device is preferably a spectrophotometer such as a Colortron 11, capable of taking RGB measurements from flat, solid-colored surfaces.

RGB stands for Red, Green, and Blue, known in color theory as "additive primaries-" When dealing with light (vs. pigment), any color can be created by starting with black (no light) and adding red, green and blue light in the correct proportions and intensities. White is created when the amounts of red, green and blue are equal and at maximum intensity.

Simplistically stated, any colored surface reflects light in a unique combination of red, green and blue, to create the colors we behold. The exact proportions of red, green and blue light reflected by a flat, solid-colored surface can be precisely determined by a spectrophotometer, a sophisticated instrument which measures light. The spectrophotometer can generate a digital "readout" of red, green and blue, in that order. For example, if 255 is the maximum, the RGB measurement for a bright red might be 241.30.80, indicating a huge preponderance of reflected red light (at 241), and very little green (30) and blue (80).

RGB is the color mode used by all computer monitors-Monitors create color by emitting light through red, green and blue phosphors. Every color that appears on the computer screen is created by some combination of red, green and blue phosphors, glowing at different intensities.

The spectrophotometer, because it can specify the precise proportions of red, green, and blue light that a color is reflecting, provides the best method of "reading" a color into the computer and reproducing it on the monitor with absolute fidelity. Other methods, such as a scanner, could also be used but are not preferred, because they cannot reproduce the colors on the computer screen with equal accuracy.

To further insure the accuracy of the monitor's color display, the monitor should preferably be "calibrated," or adjusted for color accuracy, on a daily basis. The calibration is preferably done by the spectrophotometer, using a calibration attachment, such as the Colortron ll's SpectroCalibrator, which has suction cups that stick to the face of the monitor.

The spectrophotometer is also accompanied by color management software, which interfaces the spectrophotometer with the computer. This software must be at least as sophisticated as ColorShop 2.2 for Macintosh computers, designed to be used with the Colortron 11 spectrophotometer. (If a scanner, or other instrument, is used, instead of a spectrophotometer, for entering the colors into the computer, similar color management software is also required).

The software allows the creation of self-contained color palettes. Each palette is preferably formatted to show a column of colors. In the column, for each color, there is preferably a space which includes a swatch of the color as well as a place to enter the color name. Preferably, an unlimited number of colors can be added to the palette. A new color can preferably be positioned anywhere on the palette, rather than only at the end. The palettes can easily be accessed by PhotoShop or similar high-end graphics programs.

On the corporate room computer, a set of palettes is preferably created for each color family. For example, Color Family 1 has palettes preferably titled "IBeiges and Browns," "1Blues and Greens," "1Reds and Pinks," etc. Each of these palettes also has an abbreviated "code name." For example the code for "1 Beiges and Browns" may be "IBB," the code for "IBlues and Greens" maybe "IBG," the code for "IReds and Pinks" may be "IRP."

At the computer station, the operator preferably uses the spectrophotometer to obtain an RGB reading for the color chip, while simultaneously adding the color to the desired computer color family palette. On the palette, next to the newly entered swatch of color, the operator preferably types in the color's RGB measurement (e.g., "241.30.80"), as its nametag. If the color is already present on one of the computer color palettes, the operator does not add it.

The operator preferably writes this same RGB measurement on the back of the color chip, to indicate that the color is now present on a computer color palette. He then returns the color chip to its place in the stack at the drafting table.

The operator preferably assigns the same RGB measurement, as well as the appropriate computer color palette code (e.g., "IRP") to the carpet sample.

The RGB measurement is preferably used, in the manner described above, as the "universal" color code for each color in the carpet inventory. However, some other numeric, alpha or alpha-numeric designation could also be assigned to each color, as the "universal" color code.

The ultimate aim of the color coding process is preferably (1) to create computer color palettes that contain and classify according to color family, all the carpet colors in the inventory, and only those colors and (2) to code every carpet in the entire product line with a universal color code (preferably an RGB measurement), as well as a computer color palette code.

The computer color family palettes are preferably downloaded and provided to all the retail dealers, with regular updates. Through these computer palettes, the dealer has accurate visual access to every available color in the entire corporate inventory, classified by color family.

Preferably, after a carpet sample has been color-coded (assigned a universal color code, preferably an RGB measurement), the operator visually evaluates the carpet's texture and gives it an identifying texture code. The following texture codes may be used: plush (P), textured saxony (TS), frieze (P), boucle frieze (BF), cable (C), berber (B), cut pile berber (CPB), pindot (PD), sculpture (S), or tip shear (TS).

The texture code, the universal color code (preferably the RGB measurement), and the computer color family palette code for the carpet are preferably then added to whatever product information database (such as ProductLink) the corporation or store is using to track its sales and inventory. Typically, the product information database contains a page for each carpet; the page may include fields for style name, vendor color name, width, mill, manufacturer, brand, retail cut price, retail roll price, wholesale price, warranties offered. Additional fields are added to this page, preferably for the carpet's texture code, universal color code (preferably the RGB measurement), and computer color family palette code.

Like the computer color family palettes, the product information database is preferably downloaded and provided to the retail dealers, with regular updates.

In addition, to further improve the visualization process described below, a library of carpet textures and a file of example interiors are preferably created by a photographer and an artist, at the corporate level.

The library of textures is a computer file preferably containing digital or scanned photographs of all the different available carpet textures, such as plush, textured saxony, frieze, boucle frieze, cable, cut pile barber, pindot, sculpture, and tip shear. The Photographs are taken by the photographer in natural light, of a room-sized expanse of vacuumed carpet, with a Kodak DC120 digital camera (or better), at high resolution, or with a high-quality non-digital camera. The artist then downloads or scans the photographs into PhotoShop (or equivalent), converts them into grayscale files, and adjusts them for brightness and contrast. The photographs are few in number and take little computer disk space. As described in more detail below, the texture files are overlaid with colors selected from the computer color family palettes during the visualization process to create a realistic rendering of carpet on the computer.

The file of example interiors is a computer file preferably containing digital or scanned photographs of example home interiors. These photographs are also taken by the photographer with a Kodak DC120 digital camera (or better), at high resolution, or with a non-digital camera. The photographs preferably include several well-decorated living rooms, bedrooms, dining rooms, and commercial interiors, decorated in various styles such as modern, traditional, country, and eclectic. The file preferably includes some photographs of rooms decorated in color family 1 colors, and other rooms decorated in color family 2 colors. The photographs are downloaded into PhotoShop (or equivalent) by the artist. The artist "touches up" the photographs as necessary, using the graphic tools provided in PhotoShop. Preferably, the artist also pre-selects the floor areas in the photographs and stores them as alpha channels. This will enable carpet textures and colors to be superimposed over these areas during the visualization process described below, without requiring the dealer personnel to perform this time-consuming step. Window and wall covering areas can also be pre-selected in this manner.

The file of example interiors and the library of textures are preferably downloaded and provided to all the retail dealers, along with the computer color family palettes described earlier.

These coding procedures provide numerous advantages. For example, by using the spectrophotometer to create color palettes on the computer for each of the three color families, hundreds of colors can be added to the palettes without overloading the computer, because the colors are flat and solid.

Additionally, by knowing the universal color code (such as the RGB measurement) of any carpet sample, the color of the carpet sample can be rendered on a computer screen with absolute accuracy. As described below in the visualization process of the present invention, the selected color can then be superimposed on a texture to give a realistic picture of the product, as it would appear in a room setting.

Moreover, by adding fields for the universal color code (such as RGB measurement), color family code, and the texture code in a product information database, a "digital bridge" or cross-reference is created between the product information database and the whole computer graphics program. Thus, for example, if a customer, using the visualization procedures described below, selects a color from one of the computer color palettes, a list of all the carpets offered in that color can be generated by using the color's universal color code (such as the RGB measurement) to search the product information database.

This "digital bridge" also immeasurably enhances purchasing sophistication at the dealer and corporate levels, by providing a way to track sales by color, across vendor lines. For example, current trends in customer color preference (national, regional, local) can be easily identified, and purchasing and marketing strategies adjusted with targeted finesse. Voids in key color ranges (caused by vendor drops or style changes) can be immediately detected and addressed, so that best-selling colors will be available in every needed price and texture.

The Color Room and Computer Visualization Process

The visualization process of the present invention is preferably performed in a specially designed color room 22. The color room provides an environment for presenting and using the color system at the dealer/customer level. It facilitates the customer's color selection process, using a two-fold approach: a confidence-building "color qualifying" system, followed by an accurate pre-purchase visualization experience of the products. The color room also provides a color resource lab for the staff.

As illustrated in FIG. 1, the color room 22 is a preferably self-contained, space-efficient unit designed to offer a true, focused experience of color. The walls, floor and furniture are neutral white, and the lighting options include not only incandescent fixtures, but also a skylight and/or full-spectrum fluorescent lights.

The color room preferably includes three large sliding panels 24,26,28, one for each color family, covered with good-sized representative color samples arrayed in rainbow sequence. The panels are positioned so they can be seen one at a time or all three at once.

The panels 24,26,28 are used in an initial "color qualifying" phase, to introduce the customer to the concept of color families and to quickly and easily identify the color family of the customer's home decor. The customer simply chooses the panel he or she likes best, and confirms the selection by matching the panel to any fabric samples, furniture pillows (etc.) brought from home. The customer's clothes and skin tones will invariably match the same panel. If the husband and wife prefer different color families, the third, "crossover" palette can be used.

Once the customer's color family is identified, the other panels are closed. This reduces sensory overload and begins the process of focusing on a specific color or color range for the product(s) to be purchased, with the confidence that any color in the family will match the customer's existing decor.

The color room also includes a computer station 30 with multiple seating. The computer station includes a powerful computer 32 with enough speed and RAM to run high-end graphics programs, such as PhotoShop, ColorShop, and Kodak Digital Access Software, all at once, a 20" or larger graphic display monitor with Trinitron technology 34, and a digital camera, preferably a Kodak DC120 or better. The computer station may include a scanner 36.

The computer in the color room is preferably pro-loaded with PhotoShop (or a similar graphic program), ColorShop (or a similar color management program), Kodak DC120 Digital Access Software, the computer color family palettes and other graphics files, including a library of carpet textures and a file of example interiors.

In the visualization process, the library of carpet textures and the file of example interiors are preferably used, with PhotoShop and ColorShop (or similar graphics programs), to provide the customer with a visual "preview" of different carpet options.

Any of the thousands of carpets in the corporate inventory can be accurately represented on the computer screen, by first choosing a grayscale texture photograph from the library of textures, and then overlaying the texture with a color from one of the computer color family palettes. All of the colors on the computer color family palettes represent colors in the product inventory.

This simple method of accurately rendering carpet on the computer screen answers the problems, mentioned earlier, that have plagued prior art visualization programs until now: computer overload and inaccurate color.

A computer-literate, artistically-inclined staff member can easily be taught to use the visualization process as a marketing tool. For example, to demonstrate the appearance of different carpets in room settings, the staff person can "paint" different carpets onto the floor area of one of the example interior photographs, using the method described above.

The same technique can be used to highlight the jarring impact made by a carpet of the wrong color family, vs. the harmony created by a carpet of the correct color family. In this way, it is easy to show the customer that she or he cannot make a color mistake when choosing a carpet color from the right color family.

Later in the color selection process, digital photographs of the customer's own interiors may be used to give a true preview of the carpet to be purchased. This procedure is more complicated than using one of the pre-loaded example interior photographs, and is preferably done by a designer or other person experienced in the use of PhotoShop (or whatever other high-end graphics program is being used). The details given below are described for using PhotoShop in combination with ColorShop, but similar steps would be taken using equivalent high-end graphics programs.

First, ideally, the designer or other staff member goes to the customer's home and takes color photographs on site, under adequate lighting conditions, with a digital camera, preferably a Kodak DC120 (or better). The digital photograph is then downloaded from the camera and opened in PhotoShop (or equivalent). Alternatively, the dealer, designer, or customer can provide a non-digital photograph, which can be scanned into PhotoShop, using a high-and scanner.

Once the photograph is opened in PhotoShop (or equivalent), the designer or other operator uses PhotoShop graphic tools to "touch up" the contrast, brightness, etc. The designer or other operator then preferably selects the carpet area in the photograph, using Qmask, and stores the selection as an alpha channel. This step can be time-consuming, if done well, and should be completed before the presentation is made to the customer. The rest of the steps are done in the customer's presence. (Note: in the pre-loaded example interiors, the above steps have already preferably been taken, by the corporate artist).

Next, the designer or other operator selects a desired carpet texture from the texture library and loads it into the pattern buffer. The selected floor area in the photograph of the customer's room is then filled with texture, at 100% opacity.

Then the designer or other operator calls up the desired computer color family palette from ColorShop, chooses a color as foreground, then fills the selected floor area with the foreground color at 65–80% capacity, thereby overlaying the grayscale texture with color. A great deal more sophistication can be added to this procedure, if the designer or other operator is skilled in using the graphic tools provided in PhotoShop (or similar high-end graphics program).

For use with the visualization program, the color room also preferably includes two shallow cupboards with "box" style doors, on opposite sides of the room, one for color family 1 and one for color family 2, Hanging inside each of the cupboards and on the inner faces of the cupboard doors, preferably arrayed in rainbow sequence, are a few hundred small carpet sample cuttings, preferably mounted in strips of 3 or 4, preferably representing most of the colors in the corporate inventory, in that color family. Each cutting is labeled with its RGB measurement, or other universal color code.

Duplicates of these cupboards are preferably maintained at the corporate headquarters, either in the corporate resource room or elsewhere, to monitor the need for dealer updates.

These cupboards are used in the dealer color room to supplement the visualization program. Once the customer's color family has been identified, the cupboard doors are preferably opened, to help with the choice of color or color range. When the customer selects a specific color, all the available carpets in that color can be instantly accessed through the product information database, using the universal color code (preferably the RGB measurement) on the back of the carpet cutting.

Another important function of the cupboards is to serve as color resource labs for the staff. Staff members use the color labs to match, with speed and efficiency previously unthinkable, carpet or fabric swatches brought in by customers who, for example, already know what color carpet they want or need to match a carpet purchased in the past. Even if the exact color is not present in the color lab, its place can easily be determined between two of the colors that are present. Once the color is found, the dealer can quickly access all available products in that color, from the product information database, by searching on the universal color code (such as the RGB measurement), as previously described.

In addition, the staff can use the color labs to help the customer make secondary interior decorating decisions (such as the color of window or wall coverings), once the anchoring color (carpet) has been decided. Again, the customer has the assurance that all colors within the selected color family will go together.

Finally, the color room also preferably includes a mirrored wainscoting on the back corner walls, topped by a row of windows. The purpose of the wainscoting and windows is to add a physical, tactile sense of the products to the purely visual experience provided by the computer program, and to facilitate interior decorating decisions by showing floor and window coverings in realistic proximity. A carpet sample, placed in a mirrored corner, is reflected on two walls, so it appears to be quadrupled in size. By thus visually amplifying and extending the physical image of floor covering samples, the mirrors help release the customer from the constriction of the small swatch.

The color room transforms the customer's shopping frustration and confusion into confidence and clarity, by quickly and easily identifying colors guaranteed to work in the home decor (the color family), by locating just the right color from the entire panorama of available products (through the universal color code in the product database and computer color palettes), and by previewing exactly how the product will look in the home (the computer visualization program).

Although the invention has been described with reference to the preferred embodiment illustrated in the attached drawing figures, it is noted that equivalents may be employed and substitutions made herein without departing from the scope of the invention as recited in the claims. For example, although the present invention has been described and illustrated as being particularly useful for carpet selection and simulation, it is equally useful for the classification, selection and visualization of other floor, window, and wall coverings and all other products that come in various colors.

Having thus described the preferred embodiment of the invention, what is claimed as new and desired to be protected by letters patent includes the following:

What is claimed is:

1. A method of categorizing a plurality of products by color, the method comprising the steps of:
   (a) compiling a set of flat, solid, color surfaces, including all of the colors associated with the products to be matched;
   (b) determining a color value for each of the flat color surfaces;
   (c) comparing samples of the products to be matched to the flat color surfaces in order to color-match each one of the samples to one of the flat color surfaces, the comparison being performed by a person in an environment of controlled lighting and reflection;
   (d) assigning to each sample the color value of the flat color surface to which the sample was color-matched;
   (e) categorizing each color value into a plurality of color categories;
   (f) creating a color graphic representation of each of the samples on a monitor using the assigned color values;
   (g) creating a design graphic representation of a texture, pattern, or other design aspect of each sample on the monitor; and
   (h) creating a graphic product simulation of each of the samples by merging the color graphic representation for the sample with the design graphic representation for the sample on the monitor.

2. The method as set forth in claim 1, further including the step of using the graphic product simulations in combination with a graphic image of a room to simulate how the products will look in the room.

3. The method as set forth in claim 2, further including the step of displaying the graphic product simulations in a color visualization room including a graphic display center that permits the consumer to visualize different product options.

4. The method as set forth in claim 1, wherein the flat color surfaces are paint color fans.

5. The method as set forth in claim 1, wherein the color categories include a first color category that includes all hues except orange, a second color category that includes all hues except blue-green and magenta, and a third color category of cross-over colors that can be harmoniously combined with colors in each of the first and second color categories.

6. The method as set forth in claim 1, further including the step of assigning a code to the color value of each of the flat color surfaces.

7. The method as set forth in claim 1, step (b) including the step of using a color-analyzing device to obtain a color analysis of each of the flat color surfaces.

8. The method as set forth in claim 7, further including the step of assigning values in the color analysis as the code for the color value of the corresponding value flat color surface.

9. The method as set forth in claim 1, including the step of using a color reading device to obtain the graphic representations of each of the flat color surfaces.

10. The method as set forth in claim 7, the color analyzing device being a spectrophotometer, the color analysis being an RGB measurement.

11. The method as set forth in claim 1, the products being selected from a group consisting of carpets, floor coverings, wall coverings, and window coverings.

12. The method as set forth in claim 1, wherein the graphic product simulations are created by superimposing the graphic representations of color values and the graphic representations of product designs.

13. The method as set forth in claim 1, further including the step of creating a product information database in a computer including color and design information for each of the plurality of products.

14. The method as set forth in claim 13, further including the step of using the product information database to locate all products having a specific color value and design.

15. The method as set forth in claim 1, wherein the product simulations are created by superimposing the separately databased defining characteristics as appropriate based on the pre-determined scheme of association.

* * * * *